United States Patent
Ginestet et al.

(10) Patent No.: US 8,567,841 B2
(45) Date of Patent: Oct. 29, 2013

(54) MOTOR VEHICLE TRUNK LID

(75) Inventors: Thierry Ginestet, Montigny le Bretonneux (FR); Olivier Glaumot, Forges les Bains (FR); Francois Regnault, Levallois Perret (FR)

(73) Assignee: Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 13/516,405

(22) PCT Filed: Jul. 20, 2010

(86) PCT No.: PCT/FR2010/051528
§ 371 (c)(1),
(2), (4) Date: Aug. 22, 2012

(87) PCT Pub. No.: WO2011/073544
PCT Pub. Date: Jun. 23, 2011

(65) Prior Publication Data
US 2012/0306231 A1    Dec. 6, 2012

(30) Foreign Application Priority Data
Dec. 16, 2009  (FR) .................................. 09 59030

(51) Int. Cl.
*B60J 5/10*        (2006.01)
(52) U.S. Cl.
USPC .......................................... 296/56; 296/146.8
(58) Field of Classification Search
USPC ............................. 296/56, 146.8, 76; 49/502
See application file for complete search history.

(56) References Cited

U.S. PATENT DOCUMENTS

| 4,822,098 A | 4/1989 | Vogt et al. |
| 6,053,562 A * | 4/2000 | Bednarski .................. 296/146.5 |
| 7,011,357 B2 * | 3/2006 | Seksaria et al. ............ 296/146.2 |
| 7,118,153 B2 * | 10/2006 | Kitayama et al. ............ 296/57.1 |

(Continued)

FOREIGN PATENT DOCUMENTS

| DE | 20 2006 016 378 | 4/2007 |
| DE | 10 2006 050 144 | 4/2008 |
| EP | 1 120 303 | 8/2001 |
| EP | 1 927 453 | 6/2008 |

OTHER PUBLICATIONS

Machine Translation of DE 102006050144, printed from the EPO website, Mar. 22, 2013.*

(Continued)

*Primary Examiner* — Jason S Morrow
(74) *Attorney, Agent, or Firm* — Oblon, Spivak, McClelland, Maier & Neustadt, L.L.P.

(57) ABSTRACT

A trunk lid for a motor vehicle includes an inner lining, a rear window, and a structural reinforcement. The structural reinforcement includes an upper portion which defines a rear-window opening and a lower portion which extends the upper portion toward the bottom of the trunk lid. The structural reinforcement is made in a single piece of a polymer material. An outside of the structural reinforcement is completely covered at least by the rear window and an outer covering panel placed beneath the rear window. An inside of the structural reinforcement is completely covered by the inner lining. The structural reinforcement and the inner lining interact to form a first hollow frame, of a first closed section, surrounding the rear-window opening, and to form a second peripheral hollow frame, of a second closed section, that is close to the outer edges of the trunk lid.

13 Claims, 3 Drawing Sheets

(56) References Cited

U.S. PATENT DOCUMENTS

| | | | |
|---|---|---|---|
| 7,380,866 B2 * | 6/2008 | Saitoh et al. | 296/146.5 |
| 2003/0110705 A1 * | 6/2003 | Hlavach et al. | 49/501 |
| 2004/0164580 A1 * | 8/2004 | Armstrong et al. | 296/50 |
| 2006/0022486 A1 * | 2/2006 | Kalmbach et al. | 296/146.8 |
| 2010/0314902 A1 * | 12/2010 | Leterrier et al. | 296/146.1 |
| 2011/0074179 A1 * | 3/2011 | Kuntze et al. | 296/146.6 |
| 2011/0272954 A1 * | 11/2011 | Gonin | 293/120 |
| 2012/0248814 A1 * | 10/2012 | Tsukiyama et al. | 296/146.8 |
| 2012/0280533 A1 * | 11/2012 | Gachter et al. | 296/146.8 |

OTHER PUBLICATIONS

International Search Report Issued Feb. 18, 2011 in PCT/FR10/51528 Filed Jul. 20, 2010.

* cited by examiner

MOTOR VEHICLE TRUNK LID

BACKGROUND

The invention relates generally to a trunk lid for a motor vehicle. The invention also relates to a motor vehicle comprising such a trunk lid.

Known from the prior art is document U.S. Pat. No. 4,822,098 which proposes a motor vehicle trunk lid. This trunk lid comprises an outer member, a rear window, and an inner member partly covering the outer member. The outer member consists of an upper portion which defines a rear-window opening and a lower portion which extends the upper portion toward the bottom of the trunk lid. The rear window pane is fitted to a matching surface of the outer member. The outer and inner members interact to form a hollow frame, with a closed section, surrounding the rear window pane. In the lower portion of the trunk lid, the outer member interacts with the inner member to form a hollow box assembly. One drawback of this trunk lid thus formed is that it may be insufficiently rigid. Moreover, the outer member may not be satisfactory from the aesthetic point of view because the method for molding such a part made of polymer material may have appearance defects considered to be annoying these days.

Also known is document EP1 120303 which proposes a trunk lid for a motor vehicle comprising a structural reinforcement, a rear window, and an inner lining (not shown). The structural reinforcement consists of an upper portion which defines a rear-window opening and of a lower portion which extends the upper portion toward the bottom of the trunk lid. The lid also comprises a series of functional items of equipment such as hinges, lock, rear windshield-wiper motor, window surround or else license plate. In this document, the structural reinforcement is also used as a bodywork part toward the outside and as a bearing track (sealing track) toward the inside. One drawback of this trunk lid is that its rigidity is not sufficient so that it is preferable to have additional metal reinforcements, usually made of steel, in order to attach these items of functional equipment. This solution finally has the drawback of a high overall weight for the trunk lid, mainly because of the presence of the metal reinforcements. Moreover, the multiplicity of the elements forming the structural assembly, namely the assembly dedicated to absorbing forces and achieving the rigidity required of the lid, causes a complex and costly assembly.

BRIEF SUMMARY

In order to at least partially remedy these drawbacks, the subject of the invention is a trunk lid for a motor vehicle comprising a structural reinforcement, an inner lining and a rear window; the structural reinforcement consists of an upper portion which defines a rear-window opening and of a lower portion which extends the upper portion toward the bottom of the trunk lid. According to the invention, the structural reinforcement is made in a single piece of polymer material and it is covered on its outside by an assembly consisting at least of the rear window, and of an outer covering panel placed beneath the rear window so as to completely cover the structural reinforcement; moreover, the structural reinforcement is also completely covered on its inside by the inner lining, the structural reinforcement and the inner lining interacting to form a first hollow frame, of a first closed section, surrounding the rear-window opening, and to form a second peripheral hollow frame, of a second closed section, that is close to the outer edges of the trunk lid.

The invention therefore has a combination of a structural reinforcement and an inner lining which together form a rigid structure suitable for the use of polymer materials (and more particularly for the thermoplastic material which remains flexible even in the reinforced state), and at such a level that it is no longer necessary to make use of metal reinforcements found in the embodiments of the prior art. This provides advantages in terms of simplification of assembly of the various elements of the lid, because of the reduction in the number of these elements. Moreover, this specific configuration provides advantages in terms of weight and cost, and yet further widens the possibilities of recycling if a thermo-plastic material is adopted to manufacture the structural reinforcement and/or the inner lining. Another advantage is that such a lid, seen from the outside of the vehicle, has an esthetic appearance of a level equivalent to that of a trunk lid made of sheet metal.

Finally, in comparison with the solutions of the prior art incorporating fitted metal reinforcements, the structural reinforcement made of polymer material makes it possible to increase the inertia in the working sections and also provides the possibility of having a window surround, also called window bonding track, that is continuous over the whole of its periphery.

In the trunk lid according to the invention, this structural reinforcement may have a geometry such that it has a periphery that is substantially identical to the periphery of this trunk lid. In other words, the geometry of the single-piece structure reinforcement, made of polymer material, has a geometry that is substantially identical to that of the lid.

Preferably, the upper portion of the structural reinforcement comprises lateral beams on either side of the rear-window opening, and/or an upper beam placed above the rear-window opening; and the structural reinforcement and the inner lining may interact to form first and second hollow frames of first and second closed sections, the sections being indistinguishable at the lateral beams and/or at the upper beam of the rear-window opening.

Preferably, said closed sections comprise a portion of hollow shape (called a "hollow body") which belongs to the structural reinforcement, of which the concavity is oriented toward the inside of the vehicle, and extended by a connection zone on each side of the hollow shape, and, on the other hand, a portion of the inner lining, which encloses the portion of hollow shape of the reinforcement by attachment at the connection zones.

Furthermore, a further subject of the invention is a motor vehicle comprising a trunk lid as described above.

Other advantages and features of the invention will appear in the detailed, nonlimiting description above.

BRIEF DESCRIPTION OF THE DRAWINGS

The description will be made with respect to the appended drawings amongst which.

DETAILED DESCRIPTION

Figure 1:
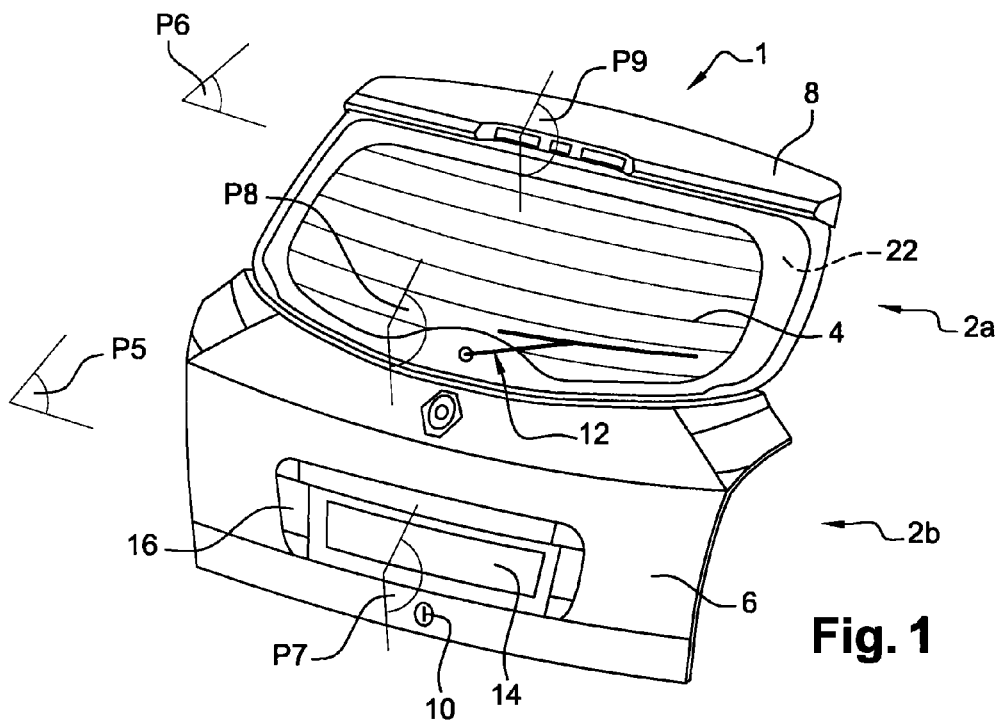
FIG. 1 represents a view in perspective of a trunk lid for a motor vehicle, from the outside of the vehicle.

With reference first of all to FIG. 1, a trunk lid 1 for a motor vehicle can be seen. The trunk lid 1 comprises an upper portion 2a which may be substantially inclined relative to the longitudinal and vertical directions, and which is extended downward by a lower portion 2b which may be substantially vertical.

The trunk lid 1 comprises a plurality of elements assembled together by one or more of the conventional techniques known to those skilled in the art which include bonding, screwing, snap-riveting, clamping, riveting, clipping, laser or ultrasound welding, etc.

Included amongst these elements, with reference to FIGS. 1 to 5, are a structural reinforcement 18, an inner lining 42, and a rear window 4. The inner lining 42 and the rear window 4 are fitted fixedly to the structural reinforcement 18. Similarly, an outer covering panel 6 arranged beneath the window 4 is fitted fixedly to the structural reinforcement 18. If necessary, additional covering elements may also be fitted fixedly to the structural reinforcement 18, such as for example the spoiler 8 which is above the rear window pane 4 in this embodiment of a trunk lid. These additional elements are used to completely cover the structural reinforcement 18.

The rear window 4 is situated in the upper portion 2a, while the outer covering panel 6 is situated in the lower portion 2b of the trunk lid 1.

Furthermore, the lid 1 may incorporate a plurality of items of functional equipment. These items of equipment are attached to the structural reinforcement 18. These items of equipment may include hinges (not shown) intended for the articulation of the trunk lid 1 on the body of the vehicle, a lid lock 10 allowing the opening and closing and the locking and unlocking of the lid, and a rear windshield-wiper system 12 comprising a driving motor.

Other items of equipment (not visible in the figures) may also be provided on the lid 1, such as an assembly for balancing the lid 1 making it easier to open/close, end-of-travel abutment means for the closing of the lid 1, these means being designed to butt against the body of the motor vehicle when the trunk lid 1 is closed, for the purpose of stopping its travel, a reversing video system, elements of the audio system of the vehicle, onboard rear lights, etc.

The structural reinforcement 18 is made in a single piece of polymer material. "Polymer" must be understood to include materials of the thermoplastic or thermosetting type. First of all it should be noted that the structural reinforcement 18 is designed to form the whole of the structure of the trunk lid 1, the other elements of the lid having only a covering or equipping function, except however for the inner lining 42 as will be seen below.

The structural reinforcement 18 has a geometry that is substantially identical to that of the lid 1, and, in particular, its periphery 20 is substantially identical to the periphery of this trunk lid 1.

The structural reinforcement 18 has in general an upper portion 18a which defines a rear-window opening 5, and a lower portion 18b which extends the upper portion toward the bottom of the trunk lid 1. The upper portion 18a comprises notably lateral beams placed on either side of the opening 5 of the rear window, and an upper beam placed above the opening 5 of the rear window.

Figure 2:
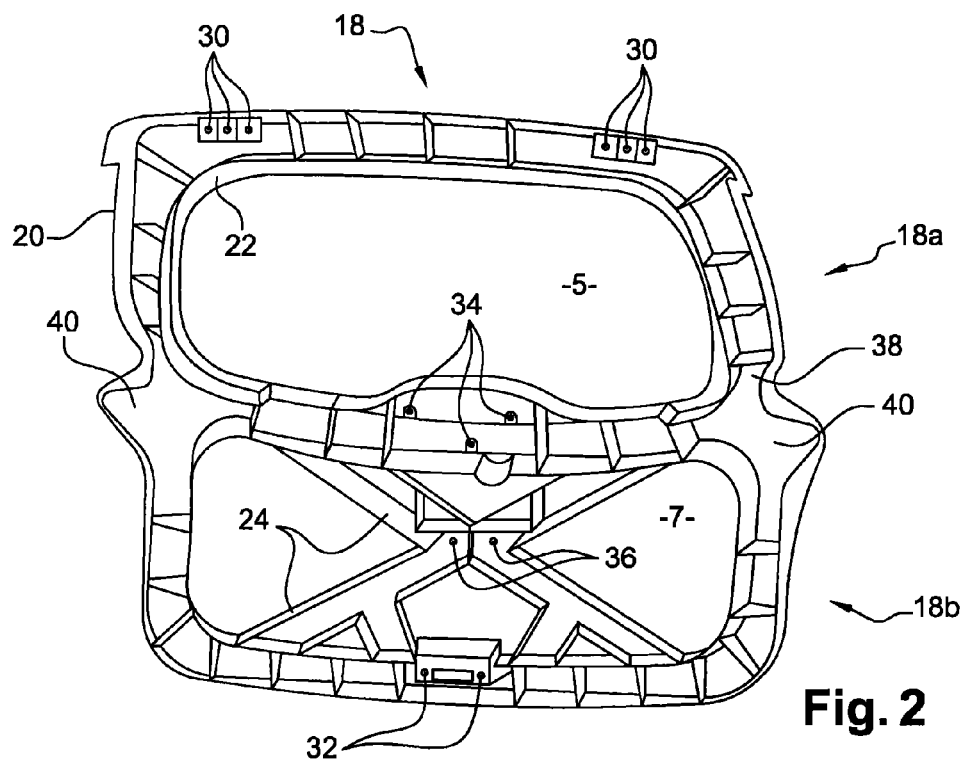
FIG. 2 represents a view in perspective of the structural reinforcement of the trunk lid, from the inside of the vehicle.

The structural reinforcement 18 has in general a first frame that surrounds the rear-window opening, and a second peripheral frame that is close to the outer edges of the trunk lid 1. The first frame and the second peripheral frame are of hollow shape. The hollow shapes are oriented toward the inside of the vehicle, that is to say in the direction of the inner lining 42. The hollow shape provides inertia to the part in order to increase its rigidity and its resistance to twisting and flexing moments for example. The first frame and the second peripheral frame have respectively a first and a second section. With reference to FIG. 2, these sections may be indistinguishable at the lateral beams and/or at the upper beam of the upper portion 18a. This means that the first frame of hollow shape and the second frame of hollow shape may be indistinguishable at the lateral beams and/or at the upper beam of the upper portion 18a. In this embodiment, this therefore gives an upper portion 18a in the shape of a frame (the upper frame) and a lower portion 18b in the shape of a frame (the lower frame) which share one and the same horizontal side arranged substantially at the separation between the upper portion 18a and lower portion 18b of the structural reinforcement 18, beneath the rear-window opening 5 (the upper frame 18a surrounds the rear-window opening 5 while the lower frame 18b surrounds another opening 7).

The first frame, which extends over the whole upper portion 18a of the reinforcement 18, has internally a surround 22 of the window forming a bonding track on which the window 4 can be fixedly mounted. Because of the production of the structural reinforcement 18 in a single piece, the window surround 22 is advantageously continuous over the whole of its periphery.

In the lower portion 18b, the structural reinforcement 18 may have additional reinforcements, for example two additional reinforcements 24 placed in an X in the opening 7 and connecting the lower horizontal side of the first frame to the lower horizontal side of the second peripheral frame. In the embodiment shown, the two additional reinforcements 24 are placed in the lower frame 18b. Naturally, the number and the placing of these additional reinforcements may be adapted depending on the requirements encountered without departing from the context of the invention.

Moreover, each of the frames and reinforcements may be fitted with ribs made in a single piece with the latter in order to increase the intrinsic rigidity of the structural reinforcement 18. Specifically, by virtue of the invention, a structural reinforcement is used in which it is possible to locally stiffen the zones in which the functional elements described above are installed. These stiffenings relate, for example, to the use of ribs and/or of increased thickness. The advantage is that these local stiffenings, although they have an impact on the outside appearance of the reinforcement, will not be visible from the outside and inside of the trunk lid 1.

Means for attaching various items of equipment of the trunk lid 1 are therefore directly provided on the single-piece structural reinforcement 18. In particular these are hinge-attachment means 30, placed on the horizontal upper side of the upper frame 18*a*, lock-attachment means 32 placed on the horizontal lower side of the lower frame 18*b*, rear windshield-wiper motor attachment means 34 placed on the horizontal side common to the two frames 18*a*, 18*b*, license-plate attachment means 36 placed at the intersection of the reinforcements 24, and lid-balancing assembly attachment means 38 placed on a lateral side of the upper frame 18*a*. Preferably, each of these attachment means takes the form of one or more holes in the structural assembly 18, these holes, which may or may not be through-holes, being designed to receive matching attachment means such as screws or other conventional elements for securing the items of equipment in question.

In FIG. 1, the one-piece structural reinforcement 18 is not visible because it is completely covered on its outside by the rear window 4, the outer covering panel 6 and the spoiler 8, so as to cover it completely. The structural assembly 18 is therefore not visible in FIG. 1, since, in rear view on the outside of the vehicle, it is entirely masked by the aforementioned covering elements 4, 6, 8 which advantageously moreover allows it to have no esthetic function, and therefore to have an optimized design, entirely dedicated to its structural function, in order to provide the rigidity necessary to such a trunk lid, in particular with the use of a thermoplastic material.

Similarly, the structural reinforcement 18 is completely covered on its inside by the inner lining 42. Moreover, and according to the invention, the structural reinforcement 18 and the inner lining 42 interact to form a first hollow frame, of a first closed section, surrounding the rear-window opening 5, and to form a second peripheral hollow frame, of a second closed section, which is close to the outer edges of the trunk lid 1. This therefore provides a structure with a generally closed frame on the periphery of the outer edges of the trunk lid 1 and on the periphery of the rear-window opening. This structure provides the rigidity necessary for this type of trunk lid 1.

Figure 3:
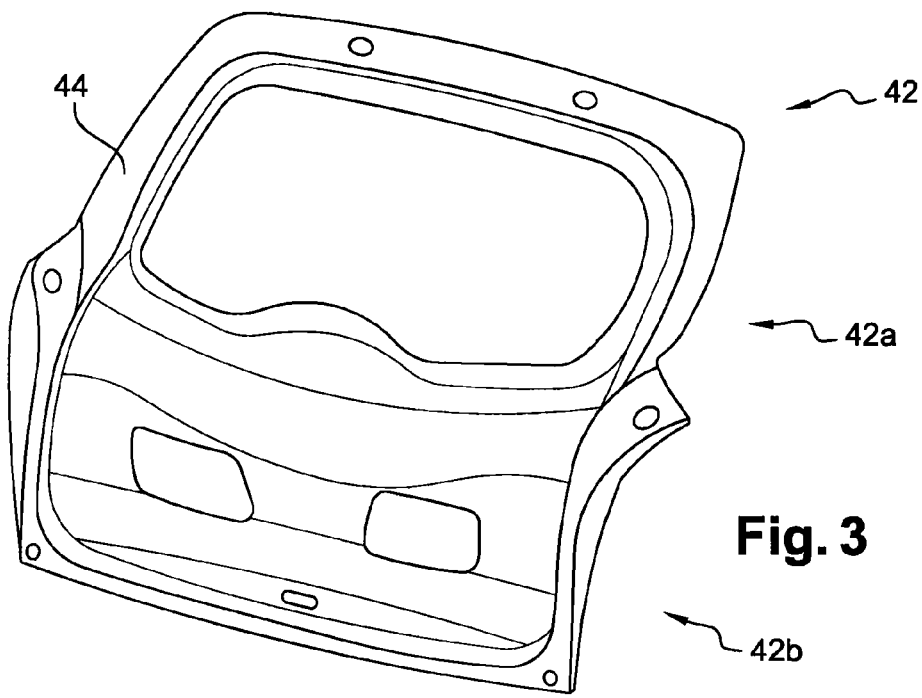
FIG. 3 represents a view in perspective of the inner lining, from the inside of the vehicle.

The inner lining 42 is made in a single piece of polymer material. FIG. 3 shows the covering inner lining 42 the shape of which is substantially identical to that of the structural reinforcement 18 to which it is designed to be fixedly attached. More precisely, it has an upper portion in the shape of a frame 42*a* the dimensions of which are substantially identical to the first frame 18*a* of the structural reinforcement 18, the frame 42*a* being extended downward by a lower panel 42*b* the periphery of which is substantially identical to that of the second peripheral frame in the lower portion 18*b* of the structural reinforcement 18. Therefore, the inner lining 42 entirely covers the inside of the structural reinforcement 18 and it also has a geometry that is substantially identical to that of the lid 1 and, in particular, its periphery 44 is substantially identical to the periphery of this trunk lid 1. If possible openings are necessary in the inner lining 42, for example in order to allow access to items of equipment of the trunk lid 1, they may then be covered by additional inner covering elements.

The one-piece inner lining 42 may comprise a generally continuous sealing track designed to interact with a weather seal of the vehicle (not shown). It should be noted that the converse is also possible, in the sense that a weather seal may be mounted on a peripheral rib formed on the inner lining 42, this seal then being capable of resting against a sealing track of the vehicle.

The inner lining 42 therefore has three main functions: a function of appearance (esthetic function), because the lining forms the inside of the trunk lid 1, that is to say the side that is in the vehicle when the trunk lid 1 is closed; a sealing function by the interaction of the sealing track (not shown) that is generally continuous with the weather seal mounted on the vehicle; and a structural function, since it interacts with the structural reinforcement 18 in order to provide the rigidity necessary for this type of lid, within the limit of complying with its appearance function which also depends on the type of material used.

Figure 4:
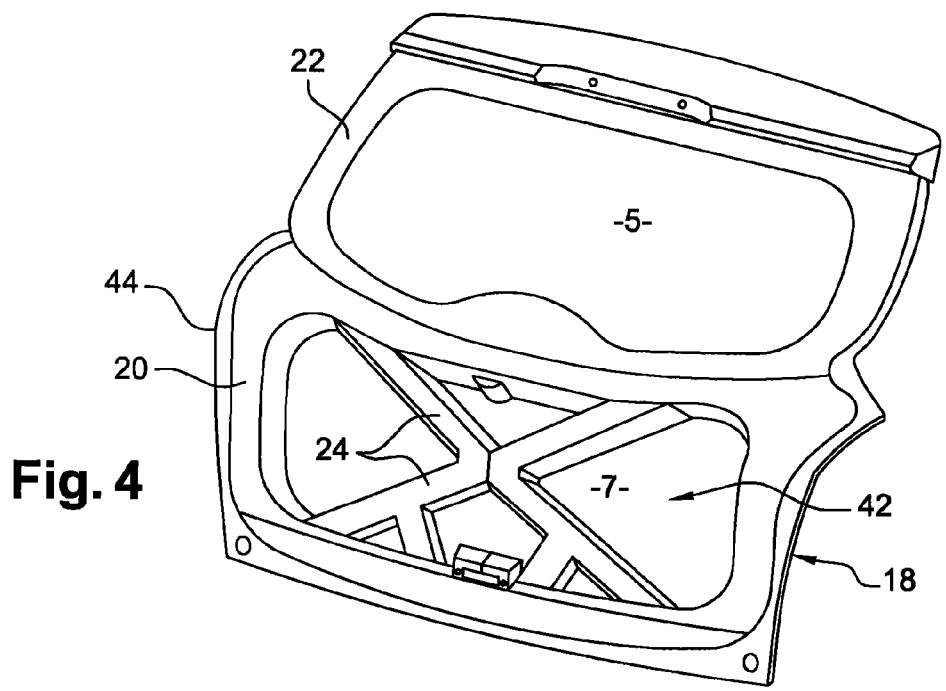
FIG. 4 is a view in perspective schematizing a step of the process for assembling the trunk lid shown in FIG. 1, from the outside of the vehicle.

The geometries of the lining 42 and of the structural reinforcement 18 are similar. These two elements are perfectly assembled by one being placed on top of the other, as shown in FIG. 4. Together they form a structure with closed frames on the periphery of the trunk lid 1, and along the window surround. In other words, their respective peripheries 20, 44, corresponding to the periphery of the trunk lid 1, are assembled along the whole length of these peripheries, similar to these two elements 18, 42 being assembled along the whole length of the window surround 22.

The structural reinforcement 18 and the inner lining 42 therefore interact to form a first hollow frame, of a first closed section, surrounding the rear-window opening, and to form a second peripheral hollow frame, of a second closed section, that is close to the outer edges of the trunk lid 1. According to the embodiment of the structural reinforcement 18 explained above, the first closed section and the second closed section may be indistinguishable at the lateral beams and/or at the upper beam of the rear-window opening 5.

Said closed sections therefore comprise on the one hand a portion of the structural reinforcement 18 and on the other hand a portion of the inner lining 42, which encloses the portion of the reinforcement 18.

The portion of the structural reinforcement 18 is of hollow shape, as has been described above, the concavity of which is oriented toward the inside of the vehicle, and the hollow shape is extended by a connection zone on each side of the latter. It should be noted that the reinforcements 24 described above may also have this hollow-shaped portion with a connection zone on each side receiving a portion of the inner lining 42.

The portion of the inner lining 42 encloses the portion of the reinforcement 18 by attachment at the connection zones. Preference will be made to an attachment of the continuous type by placing for example in contact the connection zones shown in the form of generally continuous tracks with matching zones of the inner lining 42. This configuration is suitable for an assembly process by laser or vibration welding, an assembly process in which it is necessary to have the surfaces in contact.

According to the embodiment shown in the figures, and notably in FIG. 2, the structural reinforcement 18 comprises 3 "tracks"; the first track is on the periphery of the structural reinforcement 18; the second track is on the periphery of the rear-window opening 5; and the third track is on the periphery of the opening 7 formed in the lower portion 18*b* of the structural reinforcement 18 on the inside of the lower frame 18*b*.

Examples of assembly between the structural reinforcement 18 and the inner lining 42 to form the hollow frames are shown in FIGS. 5 to 9 representing sections along the planes P5 to P9 of FIG. 1. In each of these figures there are the structural reinforcement 18 and the inner lining 42. Also found are the hollow-shaped portion 25 and the connection zones 26 and 27 on either side of the hollow portion 25 of the structural reinforcement 18. The connection zones 26 and 27 form lugs or lug portions receiving a portion of the inner lining 42. This involves placing the elements for example facing one another, or surface against surface for an assembly by bonding or else by laser or vibration welding. In this respect, the mechanical connections between the connection zones of the structural reinforcement 18 and of the inner lining 42 that are only facing one another (see for example FIG. 9, and FIG. 8 for the connection zone 27) or in contact with these zones (see for example FIGS. 5 to 8) can be chosen amongst conventional solutions known to those skilled in the art. If a snap-riveting assembly process is used, the surfaces are not in continuous contact, but rather in contact in places, a process to which is then added a bead of a material suitable for sealing the assembly.

Figure 8:
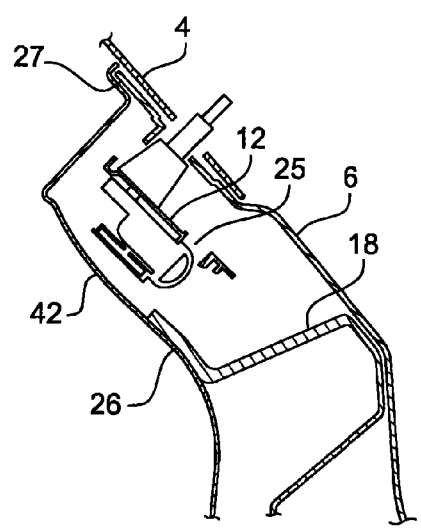
FIG. 8 represents a view in section taken along The plane P8 of FIG. 1, P8 being a substantially vertical plane passing through the rear windshield-wiper motor of the trunk lid.

However, and according to FIG. 8, it can be seen that the hollow-shaped portion 25 of the structural reinforcement 18 may also have an opening when necessary, for example to allow the passage of functional elements such as the windshield-wiper motor 12. This arrangement may then generate sections which locally are not totally closed in the strict sense of the term, but which are thus provided so as not to damage the overall firmness of the assembly between the structural reinforcement 18 and the inner lining 42.

Figure 5:
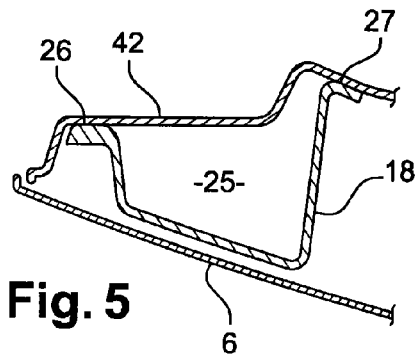
FIG. 5 represents a view in section taken along the plane P5 of FIG. 1, P5 being a substantially horizontal plane passing through an outer covering panel arranged beneath the trunk lid window.

FIG. 5 shows that the assembly of the lid continues with the mounting of the outer covering panel 6 onto the second peripheral frame of the structural reinforcement 18 in its lower portion 18b, having dimensions that are approximately identical to that of this frame in order to completely cover it in the lower portion 18b.

Figure 9:
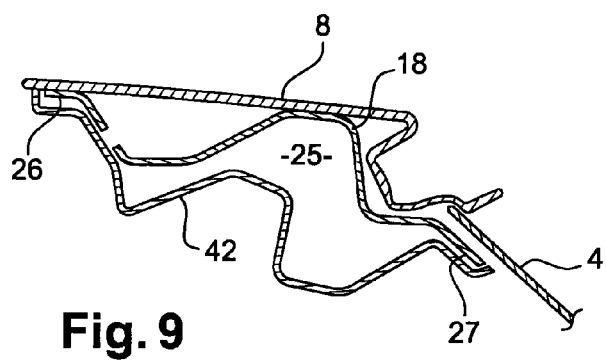
FIG. 9 represents a view in section taken along the plane P9 of FIG. 1, P9 being a substantially vertical plane passing through the upper portion of the trunk lid.

In FIG. 9, the spoiler 8 is mounted on the structural reinforcement 18, placed above the window 4. The window 4 is fitted to the surround 22 provided for this purpose as can be seen in FIG. 1.

Figure 6:
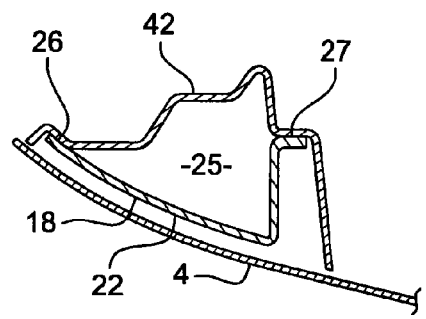
FIG. 6 represents a view in section taken along the plane P6 of FIG. 1, P6 being a substantially horizontal plane passing through the trunk lid window.

FIG. 6 taken along the plane P6 of FIG. 1 shows the assembly between the elements 4, 18 and 42 of the lid, at a lateral beam of the upper portion 18a of the structural reinforcement 18. It also represents a portion of the hollow frame of closed section obtained between the assembly 18 and the lining 42 (said section originating from the first section and the second section which are indistinguishable in this embodiment), but also the window surround 22 onto which the window 4 is fitted in a fixed and sealed manner, with the aid of a bead of adhesive (not shown). In this figure, it is possible to see that a portion of wall of the structural reinforcement 18 forms on the one side the surface of the window surround 22 and on the other side the bottom surface of the hollow-shaped portion, which makes it possible to secure the rear window pane 4 directly onto the frame formed by the structural reinforcement 18 and of the inner lining 42, thus providing increased rigidity by virtue of the support of the bonded rear window.

Figure 7:
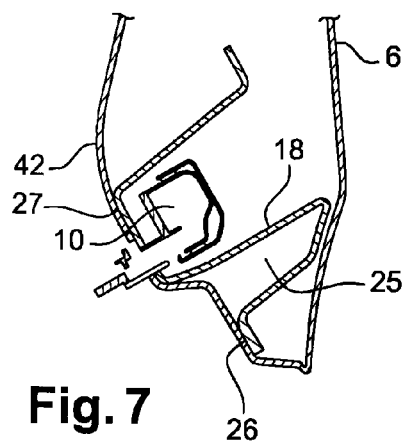
FIG. 7 represents a view in section taken along the plane P7 of FIG. 1, P7 being a substantially vertical plane passing through the lock of the trunk lid.

FIG. 7, taken along the plane P7 of FIG. 1, shows the assembly between the elements 6, 18 and 42 of the lid, at the lock 10. It represents the lock 10 mounted fixedly onto the structural reinforcement 18 and passing through the latter and the lining 42, through orifices.

Finally, FIG. 8, taken along the plane P8 of FIG. 1, shows the assembly between the elements 4, 6, 18 and 42 of the lid, at the rear windshield-wiper system motor 12, this motor preferably being situated within the hollow portion 25. It represents the motor 12 fixedly mounted onto the structural assembly 18 and passing through the latter and the window 4 through orifices.

Naturally, various modifications can be made by those skilled in the art to the invention that has just been described only as nonlimiting examples. For example, in FIG. 6 or 9, the concavity 25 and the connection zones 26 and 27 could be split in order to form distinctly the first hollow frame that surrounds the rear-window opening 5 and the second peripheral hollow frame. In this embodiment, which may take up more space, each concavity may comprise its connection zones on either side and the connection zones that are between the two concavities may be indistinguishable. This would therefore give two assembly tracks surrounding the rear-window opening instead of only one corresponding to the embodiment shown in the figures.

The trunk lid according to the invention therefore has the advantage of being light, by approximately 20% relative to a steel sheet trunk lid, of having a rigidity designed for the use that is intended for it without having to use additional metal structural parts, an esthetic appearance of the same level as trunk lids made of sheet metal, an excellent recyclability (made of thermoplastic), and all this for a cost that does not exceed that of a sheet metal trunk lid.

What is claimed is:
1. A trunk lid for a motor vehicle, comprising:
an inner lining;
a rear window; and
a structural reinforcement including an upper portion which defines a rear-window opening and a lower portion which extends from the upper portion toward a bottom of the trunk lid, wherein
the structural reinforcement single piece of a polymer material,
an outside of the structural reinforcement is completely covered at least by the rear window and with an outer covering panel placed beneath the rear window, and
an inside of the structural reinforcement is completely covered by the inner lining, the structural reinforcement and the inner lining interacting to form a first hollow frame, of a first closed section, surrounding the rear-window opening, and to form a second peripheral hollow frame, of a second closed section, that is close to outer edges of the trunk lid.

2. The trunk lid as claimed in claim 1, wherein the upper portion of the structural reinforcement comprises lateral uprights on either side of the rear-window opening, and the structural reinforcement and the inner lining interact to form the first and second hollow frames of first and second closed sections, the sections being indistinguishable at the lateral uprights.

3. The trunk lid as claimed in claim 1, wherein the upper portion of the structural reinforcement comprises an upper upright placed above the rear-window opening, and the structural reinforcement and the inner lining interact to form first and second hollow frames of the first and second closed sections, the sections being indistinguishable at the upper upright of the rear-window opening.

4. The trunk lid as claimed in claim 1, wherein the structural reinforcement and the inner lining interact to form the first and second hollow frames of the first and second closed sections, said sections comprising a portion of hollow shape which belongs to the structural reinforcement, a concavity of the hollow shape is oriented toward the inside of the vehicle, and extended by a connection zone on each side of the hollow shape, and said sections comprising a portion of the inner lining, which encloses the portion of hollow shape of the reinforcement by attachment at the connection zones.

5. The trunk lid as claimed in claim 1, wherein the inner lining comprises a sealing track that is generally continuous and designed to interact with a weather seal of the vehicle.

6. The trunk lid as claimed in claim 1, further comprising, fixedly attached to the structural reinforcement above said window, a spoiler made of a polymer material.

7. The trunk lid as claimed in claim 1, wherein the structural reinforcement includes additional reinforcements connecting a lower horizontal side of the first frame to a lower horizontal side of the second peripheral frame.

8. A motor vehicle, comprising:
the trunk lid as claimed in claim 1.

9. The trunk lid as claimed in claim 1, wherein the polymer material of the structural reinforcement is a thermoplastic material.

10. The trunk lid as claimed in claim 9, wherein the inner lining is a thermoplastic material.

11. The trunk lid as claimed in claim 1, wherein the inner lining is a single piece of polymer material.

12. The trunk lid as claimed in claim 11, wherein the polymer material of the inner lining is a thermoplastic material.

13. The trunk lid as claimed in claim 6, wherein the polymer material of the spoiler is thermoplastic or thermosetting.

* * * * *